US012631203B2

(12) United States Patent　　　　(10) Patent No.: US 12,631,203 B2
Kaunas et al.　　　　　　　　　　(45) Date of Patent:　　May 19, 2026

(54) FASTENING SYSTEM AND METHOD

(71) Applicant: Preformed Line Products Company,
Cleveland, OH (US)

(72) Inventors: Darius Kaunas, Strongsville, OH (US);
Todd Laird, Cleveland, OH (US);
Patrick Cunningham, Cleveland, OH
(US)

(73) Assignee: Preformed Line Products Company,
Cleveland, OH (US)

( * ) Notice: Subject to any disclaimer, the term of this
patent is extended or adjusted under 35
U.S.C. 154(b) by 0 days.

(21) Appl. No.: 18/911,063

(22) Filed: Oct. 9, 2024

(65) Prior Publication Data

US 2026/0098555 A1　　Apr. 9, 2026

(51) Int. Cl.
F16B 5/06　　　(2006.01)
F16B 2/06　　　(2006.01)
F16B 2/20　　　(2006.01)
(52) U.S. Cl.
CPC .............. F16B 5/0635 (2013.01); F16B 2/06
(2013.01); F16B 2/20 (2013.01)
(58) Field of Classification Search
CPC ........... F16B 5/0635; F16B 5/06–0607; F16B
2005/0678; F16B 2/02; F16B 2/06; F16B
2/20; F16B 2/24–245
See application file for complete search history.

(56) References Cited

U.S. PATENT DOCUMENTS

| 5,884,373 | A | 3/1999 | Kawamura | |
| 9,748,892 | B2 | 8/2017 | Almy et al. | |
| 11,757,400 | B1 | 9/2023 | Jasmin et al. | |
| 2020/0173470 | A1 * | 6/2020 | Binkert | F16B 5/125 |
| 2020/0208662 | A1 | 7/2020 | Spearing et al. | |

FOREIGN PATENT DOCUMENTS

CN　　　　115242180　A　* 10/2022　.............. F24S 25/60

OTHER PUBLICATIONS

Translation of CN115242180 (Year: 2020).*
Patent Cooperation Treaty (PCT), International Search Report and
Written Opinion for Application PCT/US2025/050388 filed on Oct.
9, 2025, mailed Jan. 30, 2026, International Searching Authority,
US.

* cited by examiner

*Primary Examiner* — Matthew P Travers
(74) *Attorney, Agent, or Firm* — McDonald Hopkins LLC

(57)　　　　　ABSTRACT
A clip includes a first clip end portion extended in a lateral
direction of the clip. The clip also includes a second clip end
portion extended in the lateral direction of the clip, and
spaced from the first clip end portion in a normal direction
of the clip perpendicular to the lateral direction. The clip also
includes a middle clip portion that connects the first clip end
portion and the second clip end portion, where the first clip
end portion and the second clip end portion define an
opening at a side of the clip opposite the middle clip portion
in the lateral direction. The clip also includes at least one tab
inclined outward beyond an exterior clip surface in the
normal direction, along the lateral direction from the middle
clip portion toward the opening.

10 Claims, 7 Drawing Sheets

FASTENING SYSTEM AND METHOD

BACKGROUND

Fasteners are widely used in a variety of industrial and mechanical applications to securely join components, such as panels or flanges, together. In this regard, for example, fastening flanges is often a critical task in industries such as automotive, aerospace, and construction, where strong and durable connections are necessary to maintain structural integrity between distinct components.

Traditional means rely on penetrating fasteners such as screws, bolts, or rivets that pass through materials for joining objects. While such fasteners provide secure attachment, they often introduce disadvantages such as potential weakening or damage of joined objects due to the penetration. Over time, this can lead to fatigue or failure, especially in materials susceptible to cracking or corrosion at the points of penetration.

Furthermore, many known fastener application systems can be cumbersome or require significant time or manual effort to install. Also, an associated application process may involve multiple parts and tools, leading to additional inefficiencies in assembly time and complexity.

BRIEF DESCRIPTION

According to one aspect, a clip includes a first clip end portion extended in a lateral direction of the clip. The clip also includes a second clip end portion extended in the lateral direction of the clip, and spaced from the first clip end portion in a normal direction of the clip perpendicular to the lateral direction. The clip also includes a middle clip portion that connects the first clip end portion and the second clip end portion, where the first clip end portion and the second clip end portion define an opening at a side of the clip opposite the middle clip portion in the lateral direction. The clip also includes at least one tab inclined outward beyond an exterior clip surface in the normal direction, along the lateral direction from the middle clip portion toward the opening.

According to another aspect, a fastening system includes a clip and a clamp. The clip includes a first clip end portion extended in a lateral direction of the clip. The clip also includes a second clip end portion extended in the lateral direction of the clip, and spaced from the first clip end portion in a normal direction of the clip perpendicular to the lateral direction. The clamp includes a first clamp end portion and a second clamp end portion extended in the lateral direction of the clip. The clamp also includes an interior clamp surface formed from the first clamp end portion and the second clamp end portion. The interior clamp surface holds the clip from an exterior clip surface such that the clip slides in the lateral direction, relative to the clamp, from a loaded position to an inserted position, where the first clip end portion and the second clip end portion are respectively driven inward by the first clamp end portion and the second clamp end portion in the normal direction.

According to another aspect, a method of assembling a fastening system includes placing a clip in a clamp. The clip includes a first clip end portion extended in a lateral direction of the clip, and includes a second clip end portion extended in the lateral direction of the clip, and spaced from the first clip end portion in a normal direction of the clip perpendicular to the lateral direction, where the first clip end portion and the second clip end portion define an exterior clip surface and an opening into the clip in the normal direction. The clamp includes a first clamp end portion and a second clamp end portion extended in the lateral direction of the clip, and an interior clamp surface formed from the first clamp end portion and the second clamp end portion. As such, placing the clip in the clamp causes the interior clamp surface to hold the clip in a loaded position from the exterior clip surface such that the clip slides in the lateral direction, relative to the clamp, from the loaded position to an inserted position when an object is inserted into the opening.

The innovation described herein describes a fastening system that offers efficient frame installation to a supporting structure. In addition to other described features, functions, and benefits, the fastening system as described herein can enable securely and efficiently joining planar elements with clamping.

DETAILED DESCRIPTION

Figure 1:
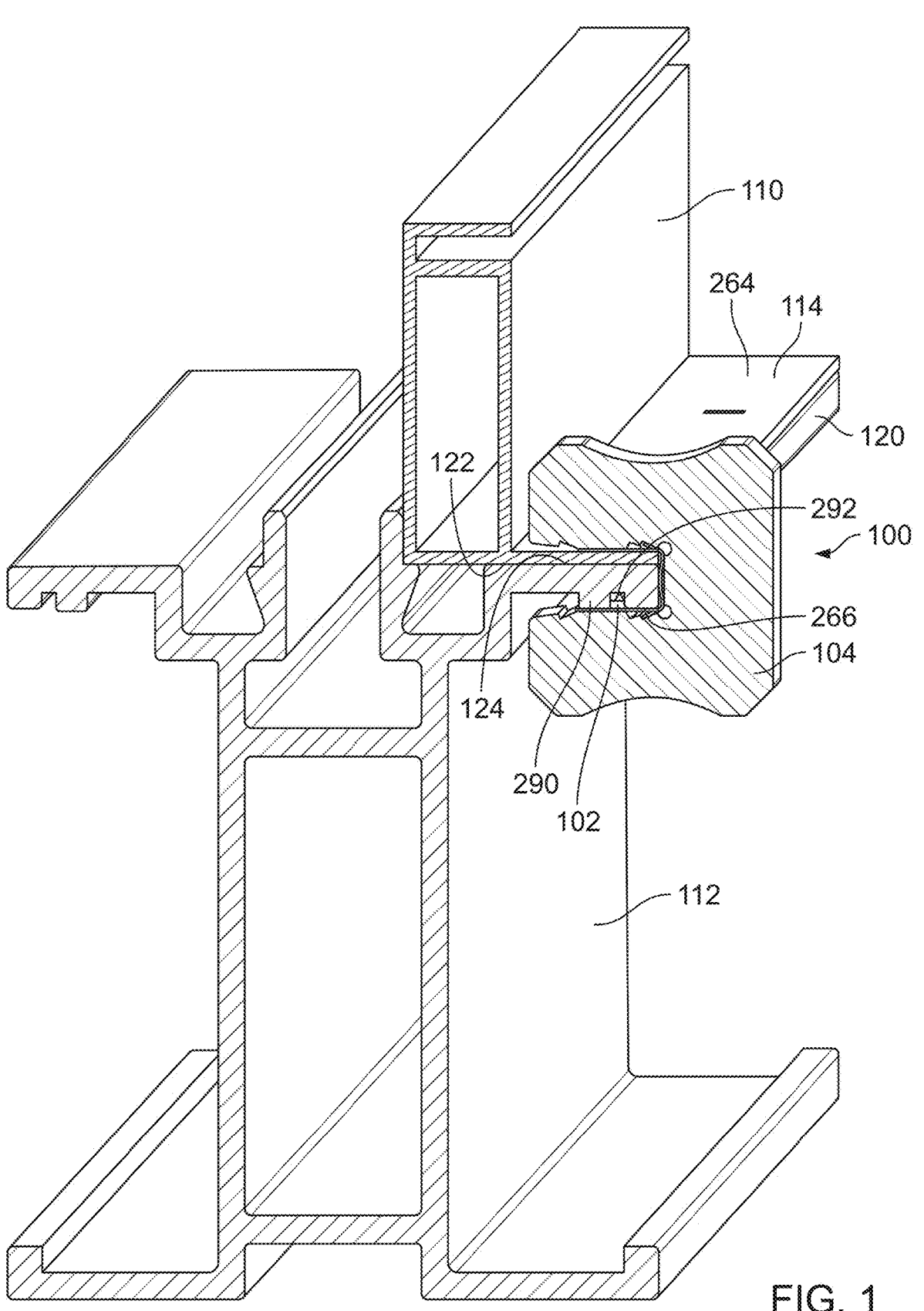
FIG. 1 is a perspective view of a fastening system including a clip and a clamp in accordance with aspects of the innovation.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 depicts a fastening system 100 including a clip 102 and a clamp 104 that fix a frame 110 with a supporting rail 112 at a first flange 114 and a second flange 120. The first flange 114 and the second flange 120 respectively extend from the frame 110 and the rail 112, where the first flange 114 forms a bottom surface 122 disposed along a top surface 124 of the second flange 120. The first flange 114 and the second flange 120 extend flatly from the frame 110 and the rail 112 such that the bottom surface 122 and the top surface 124 are planar, parallel, and contact each other.

Figure 2:
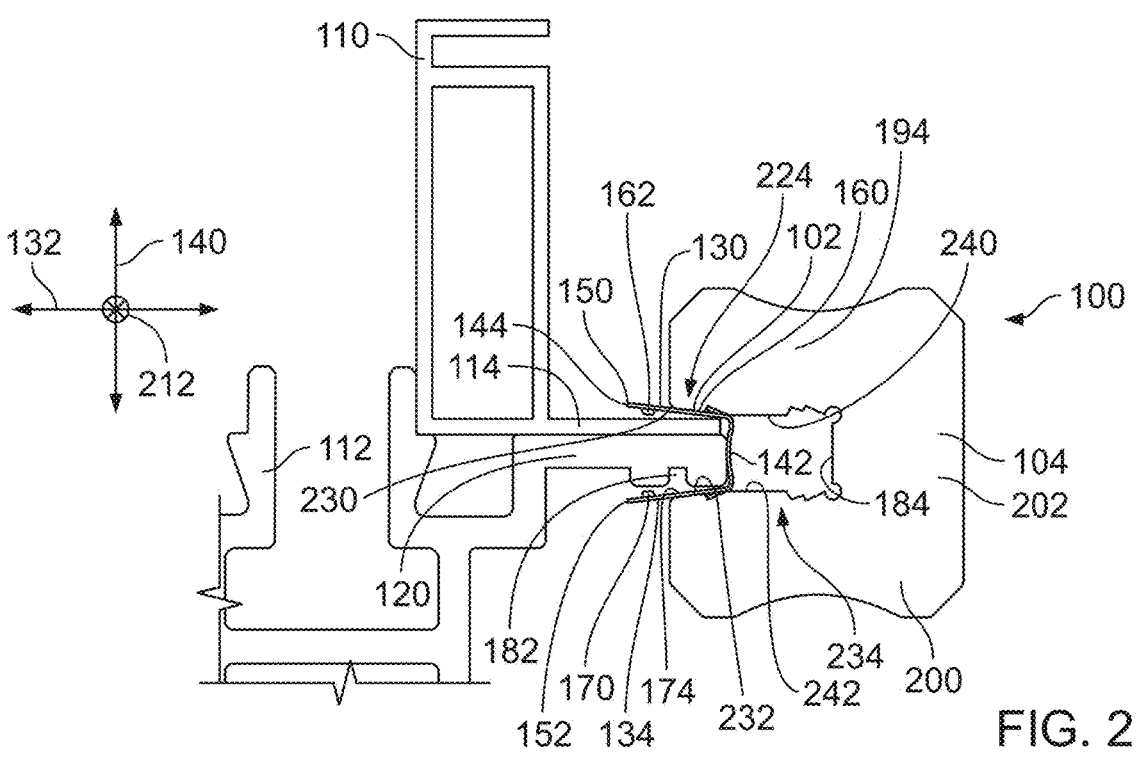
FIG. 2 is a side view of the fastening system of FIG. 1 with the clip in a loaded position relative to the clamp.

FIG. 2 depicts a cross-sectional view of the clip 102 and the clamp 104 at the first flange 114 and the second flange 120. As shown in FIG. 2, the first flange 114 and the second flange 120 are inserted in the clip 102 together as an object, where the clamp 104 holds the clip 102.

The clip 102 includes a first clip end portion 130 extended in a lateral direction of the clip 102, indicated by an arrow 132. The clip 102 also includes a second clip end portion 134 extended in the lateral direction of the clip 102. The second clip end portion 134 is spaced from the first clip end portion 130 in a normal direction of the clip 102 perpendicular to the lateral direction, indicated by an arrow 140.

The clip 102 also includes a middle clip portion 142 that connects the first clip end portion 130 and the second clip end portion 134 such that the first clip end portion 130 and the second clip end portion 134 define an opening 144 into the clip 102 at a side of the clip 102 opposite the middle clip portion 142 in the lateral direction of the clip 102. In this regard, the first clip end portion 130 forms a first distal tip 150, and the second clip end portion 134 forms a second distal tip 152 offset from the first distal tip 150 in the normal direction of the clip 102, where the first distal tip 150 and the second distal tip 152 define the opening 144. The clip 102 is configured to receive the first flange 114 and the second flange 120 as an object inserted into the opening 144, between the first clip end portion 130 and the second clip end portion 134 in the normal direction of the clip 102.

Figure 3:
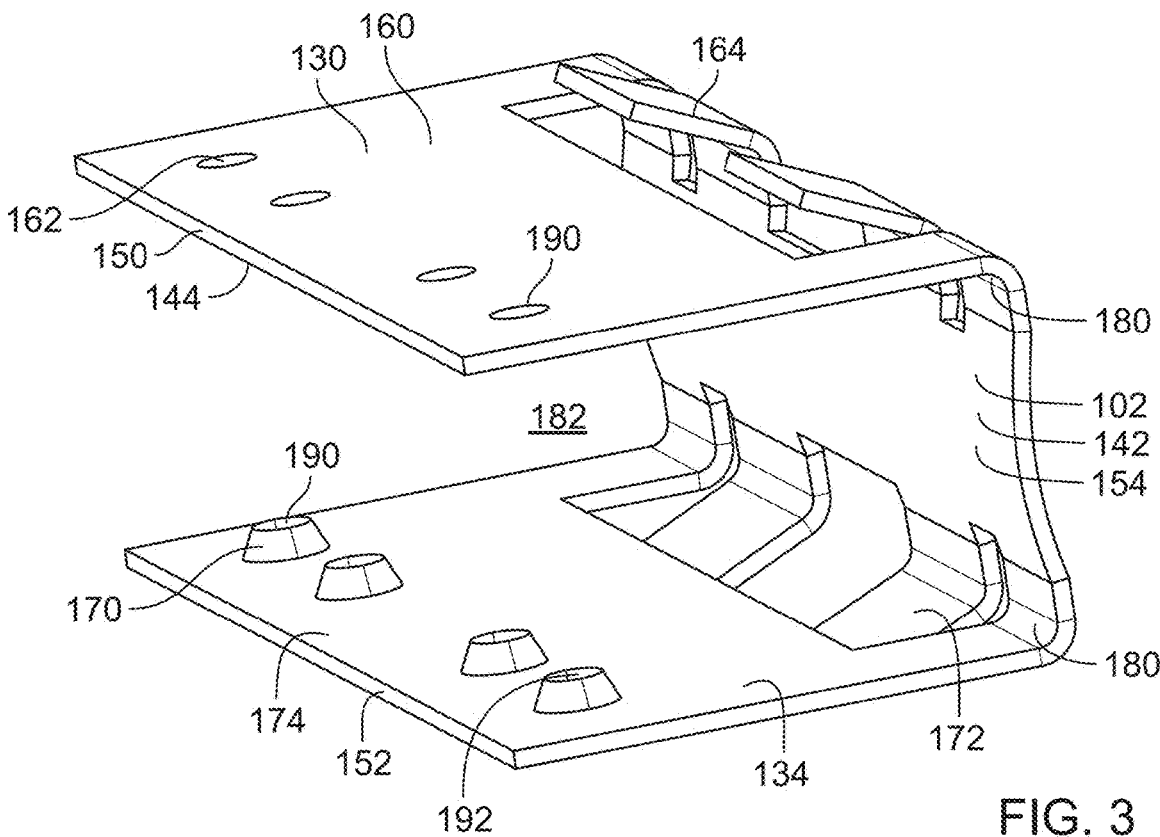
FIG. 3 is a perspective view of an example clip in accordance with aspects of the innovation.

FIG. 3 depicts a perspective view of the clip 102. As shown in FIG. 3, the clip 102 includes a single continuous body 154 that forms each of the first clip end portion 130, the middle clip portion 142, and the second clip end portion 134.

As such, the first clip end portion 130, the middle clip portion 142, and the second clip end portion 134 form an exterior clip surface 160 that is continuous from the first distal tip 150 at the first clip end portion 130, around first protrusions 162 and first tabs 164, across the middle clip portion 142, around second protrusions 170 and second tabs 172, to the second distal tip 152 at the second clip end portion 134. Also, the first clip end portion 130, the middle clip portion 142, and the second clip end portion 134 form an interior clip surface 174 that is continuous from the first distal tip 150 at the first clip end portion 130, around the first protrusions 162 and the first tabs 164, across the middle clip portion 142, around the second protrusions 170 and the second tabs 172, to the second distal tip 152 at the second clip end portion 134.

With this construction, the clip 102 may be formed from pressed or cut sheet metal. In this manner, the clip 102 may be manufactured relatively efficiently as compared to joining elements of the clip 102 from separate initial components. Also, the first clip end portion 130 and the second clip end portion 134 may slide the interior clip surface 174 against the first flange 114 and the second flange 120 in the lateral direction of the clip 102 when the first flange 114 and the second flange 120 are inserted into the opening 144. Also, the first clip end portion 130 and the second clip end portion 134 may slide the exterior clip surface 160 against the clamp 104 when the clip 102 is received in the clamp 104, as described in greater detail below.

Referring back to FIG. 2, the first clip end portion 130 and the second clip end portion 134 are angled from each other in the normal direction of the clip 102. In this regard, at least one of the first clip end portion 130 and the second clip end portion 134 is inclined in the normal direction of the clip 102 away from the other of the first clip end portion 130 and the second clip end portion 134, along the lateral direction from the middle clip portion 142 toward the opening 144.

The first clip end portion 130 and the second clip end portion 134 each extend flatly from the middle clip portion 142. The middle clip portion 142 extends in the normal direction between the first clip end portion 130 and the second clip end portion 134. The middle clip portion 142 forms corners 180 with each of the first clip end portion 130 and the second clip end portion 134 along the interior clip surface 174, defining a rectangular cavity 182 in the clip 102, in the normal direction of the clip 102. In this manner, the clip 102 is shaped to receive a pair of straight flanges, such as the first flange 114 and the second flange 120, at the interior clip surface 174 where the flanges are stacked in the normal direction of the clip 102 and inserted into the opening 144 in the lateral direction.

The first clip end portion 130 and the second clip end portion 134 are angled away from each other in the normal direction of the clip 102, from the middle clip portion 142 toward the opening 144 such that the first distal tip 150 and the second distal tip 152 are spaced from each other a greater distance than the corners 180 in the normal direction. In this regard, the first clip end portion 130 and the second clip end portion 134 are inclined outward in the normal direction of the clip 102 from the middle clip portion 142 toward the opening 144, and respectively to the first distal tip 150 and the second distal tip 152 in the lateral direction. As such, the opening 144 is larger than the middle clip portion 142 in the normal direction, and the cavity 182 reduces in size along the lateral direction of the clip 102. With this construction, the clip 102 may receive the first flange 114 and the second flange 120 in the opening 144 without the first clip end portion 130 or the second clip end portion 134 obstructing the first flange 114 or the second flange 120.

While, as depicted, each of the first clip end portion 130 and the second clip end portion 134 are inclined in the normal direction of the clip 102, only one of the end portions may be inclined in the normal direction for defining the opening 144 larger than the middle clip portion 142 without departing from the scope of the subject disclosure. With this construction, the first protrusions 162 and the second protrusions 170 may be respectively maneuvered over the first flange 114 and the second flange 120 when the first flange 114 and the second flange 120 are received in the clip 102, and then pressed flatly by the clamp 104 into the first flange 114 and the second flange 120 through the first clip end portion 130 and the second clip end portion 134.

With continued reference to FIG. 2, the first tabs 164 and the second tabs 172 each extend from the middle clip portion 142, beyond the exterior clip surface 160 in the normal direction of the clip 102. The first tabs 164 and the second tabs 172 respectively extend along the first clip end portion 130 and the second clip end portion 134. More specifically, the first tabs 164 and the second tabs 172 respectively extend upward and downward from the middle clip portion 142 in the normal direction of the clip 102, and are inclined outward from the exterior clip surface 160 along the first clip end portion 130 and the second clip end portion 134.

Figures 4, 7:
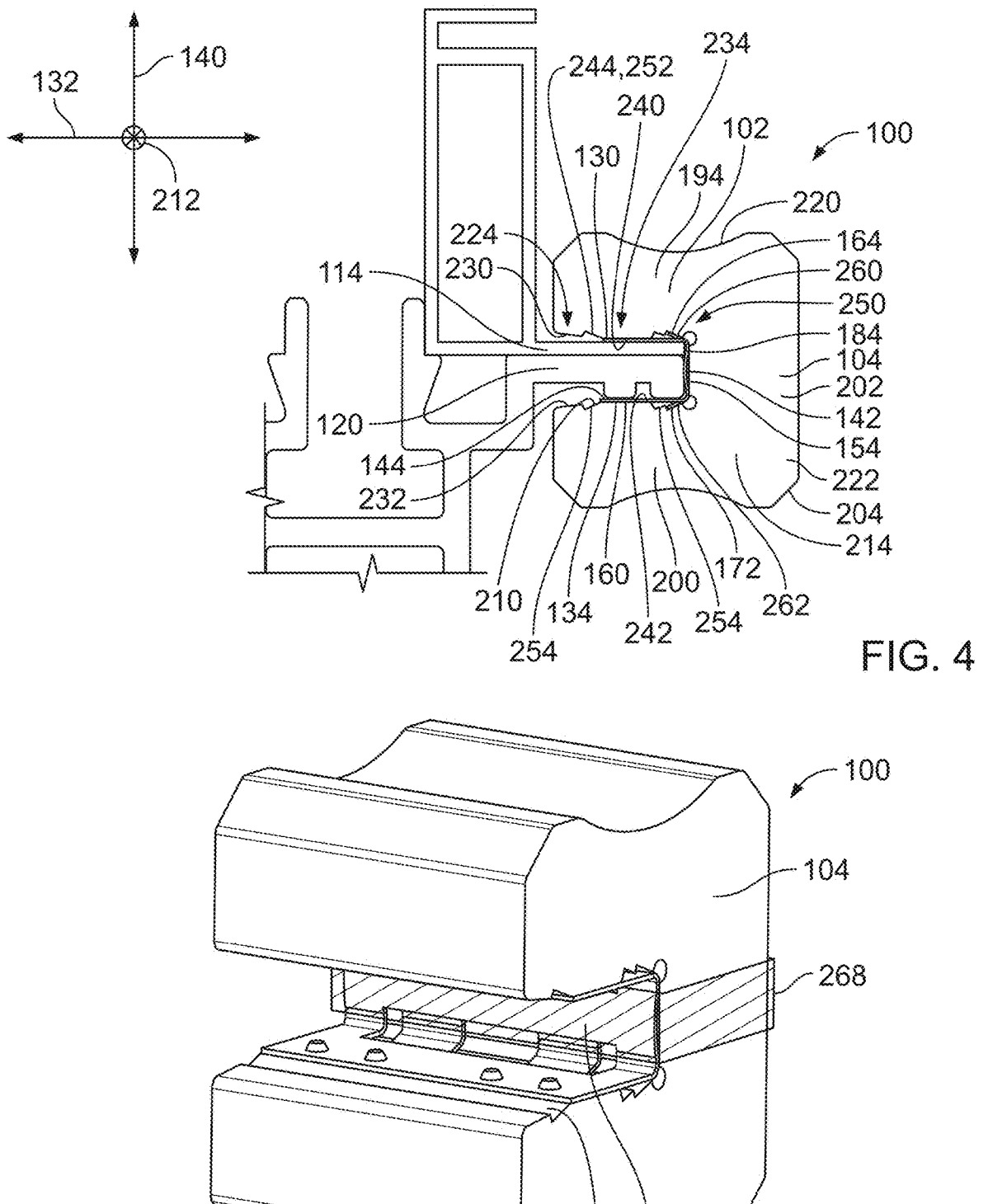
FIG. 4 is a side view of the clip in a first clip position.
FIG. 7 is a perspective view of the fastening system of FIG. 1, including an example retaining mechanism disposed around the clip and the clamp.

As such, as depicted in FIG. 4, the first tabs 164 and the second tabs 172 are bent from the middle clip portion 142 to be inclined along the lateral direction from the middle clip portion 142 toward the opening 144. With this construction, the first tabs 164 and the second tabs 172 may elastically deform in the normal direction and the lateral direction of the clip 102 when the clip 102 is inserted in the clamp 104 and slides along an interior clamp surface 184 in the lateral direction of the clip 102.

The first tabs 164 and the second tabs 172 each extend directly from the body 154 at the middle clip end portion 142. In this regard, the first tabs 164 and the second tabs 172 are leaf springs integrally formed from the body 154. With this construction, the clip 102 including the first tabs 164 and the second tabs 172 may be formed from pressed or cut sheet metal. In this manner, the clip 102 may be manufactured relatively efficiently as compared to joining elements of the clip 102 from separate initial components.

With reference to FIG. 2, the first protrusions 162 and the second protrusions 170 respectively extend from one of the first clip end portion 130 and the second clip end portion 134 in the normal direction of the clip 102, toward the other of the first clip end portion 130 and the second clip end portion 134. More specifically, the first protrusions 162 extend downward from the interior clip surface 174 at the first clip end portion 130, into the cavity 182, and toward the second clip end portion 134 in the normal direction of the clip 102. The second protrusions 170 extend upward from the interior clip surface 174 at the second clip end portion 134, into the cavity 182, and toward the first clip end portion 130 in the normal direction of the clip 102.

The first protrusions 162 and the second protrusions 170 each extend directly from the first clip end portion 130 and the second clip end portion 134. In this regard, as shown in FIG. 3, the first protrusions 162 and the second protrusions 170 are respectively integrally formed from the body 154 around apertures 190 defined in the body 154 at the first clip end portion 130 and the second clip end portion 134. With this construction, the clip 102 including the first protrusions 162 and the second protrusions 170 may be formed from pressed or cut sheet metal. In this manner, the clip 102 may be manufactured relatively efficiently as compared to joining elements of the clip 102 from separate initial components.

Each of the first protrusions 162 and the second protrusions 170 defines an interior edge 192 located between the first end portion 130 and the second end portion 134 in the normal direction of the clip 102. Each interior edge 192 respectively forms a portion of the corresponding first protrusion 162 or second protrusion 170 that is most extended from the interior clip surface 174 in the normal direction of the clip 102.

With this construction, the first protrusions 162 and the second protrusions 170 are configured to press or bite the interior edges 192 into and grip an object inserted in the cavity 182, such as the first flange 114 and the second flange 120. As such, the clip 102 may be fastened to an object inserted in the cavity 182 when the first protrusions 162 and the second protrusions 170 are pressed inward in the normal direction of the clip 102, through the first clip end portion 130 and the second clip end portion 134. While, as depicted, the interior edges 192 are circular edges formed around the apertures 190, the first protrusions 162 and the second protrusions 170 may additionally or alternatively include protrusions having a variety of shapes or points directed into the cavity 182 for gripping an object without departing from the scope of the subject disclosure.

As shown in FIG. 2, the clamp 104 holds the clip 102 from the exterior clip surface 160 using the interior clamp surface 184. In this regard, the clip 102 is disposed in a loaded position with respect to the clamp 104. The clip 102 slides in the lateral direction of the clip 102 relative to the clamp 104 from the loaded position to an inserted position depicted in FIG. 4 when driven by an object, such as the first flange 114 and the second flange 120, inserted in the opening 144.

With continued reference to FIG. 4, the clamp 104 includes a first clamp end portion 194 extended in the lateral direction of the clip 102, along the first clip end portion 130. The clamp 104 also includes a second clamp end portion 200 extended in the lateral direction of the clip 102, along the second clip end portion 134. The second clamp end portion 200 is spaced from the first clamp end portion 194 in the normal direction of the clip 102.

The clamp 104 includes a middle clamp portion 202 that extends in the normal direction of the clip 102, and connects the first clamp end portion 194 and the second clamp end portion 200. The interior clamp surface 184 at the clamp middle portion 202 extends flatly in the normal direction of the clip 102 and abuts the exterior clip surface 160 at the middle clip portion 142 when the clip 102 is disposed in the inserted position. With this construction, the middle clip portion 142 is obstructed from moving further in the lateral direction of the clip 102 when the clip 102 is driven from the loaded position to the inserted position.

The first clamp portion 194, the middle clamp portion 202, and the second clamp portion 200 form an exterior clamp surface 204. The exterior clamp surface 204 is concave in the normal direction of the clip 102 at the first clamp end portion 194 and the second clamp end portion 200. The exterior clamp surface 204 also extends flatly in the normal direction of the clip 102 at the middle clamp portion 202. With this construction, a user may grip the clamp 104 at the first clamp end portion 194 and the second clamp end portion 200, position the clip 102 and the clamp 104 at the first flange 114 and the second flange 120, and drive the clamp 104 over the clip 102, the first flange 114, and the second flange 120 in the lateral direction of the clip 102 at the middle clamp portion 202 from the loaded position toward the inserted position.

In an embodiment, a user may drive the clamp 104 over the clip 102 with an impact from a hammer. In the embodiment, the clip 102 may be shaped and sized for an interference fit over the first flange 114 and the second flange 120. With this construction, driving the clip 102 over the first flange 114 and the second flange 120 with a hammer tightly fixes the clip 102 with the first flange 114 and the second flange 120 against the clamp 104.

When the clip 102 is driven from the loaded position toward the inserted position as shown in FIGS. 2 and 4, the first clip end portion 130 and the second clip end portion 134 are driven inward in the normal direction of the clip 102, respectively into the first flange 114 and the second flange 120.

In this manner, the interior edges 192 of the first protrusions 162 and the second protrusions 170 are respectively driven into the first flange 114 and the second flange 120. In an embodiment where the first flange 114 or the second flange 120 are formed from anodized aluminum or another metal having an oxide layer coating, the first protrusions 162 or the second protrusions 170 may pierce the oxide layer coating at the first flange 114 or the second flange 120, where the clip 102 bonds with the first flange 114 or the second flange 120 through the first protrusions 162 or the second protrusions 170.

With reference to FIG. 4, the first clamp end portion 194 and the second clamp end portion 200 extend from the middle clamp portion 202 in the lateral direction of the clip 102, and form a channel 210 at a side of the clamp 104 opposite the middle clamp portion 202 in the lateral direction. The first clamp end portion 194, the middle clamp portion 202, and the second clamp end portion 200 are integrally formed with each other, and continuously form the interior clamp surface 184.

The interior clamp surface 184 defines the channel 210 extended in a longitudinal direction of the clip 102 perpendicular to the normal direction and the lateral direction, indicated by an arrow 212. The interior clamp surface 184 defines the channel 210 straight in the longitudinal direction of the clip 102 where the clip 102 is in the inserted position. With this construction, the clip 102 may be removed from the clamp 104 by moving the clamp 104 in the longitudinal direction of the clip 102, along the channel 210.

The first clamp portion 194, the middle clamp portion 202, and the second clamp portion 200 form a first longitudinal clamp end 214, and form a second longitudinal clamp end 220 at a side of the clamp 104 opposite the first longitudinal clamp end 214 in the longitudinal direction of the clip 102. The first longitudinal clamp end 214 defines a side clamp surface 222 that extends perpendicular to the channel 210 in the front-back direction and the normal direction of the clip 102. The side clamp surface 222 is flat, and may drive the clamp 104 in the longitudinal direction of the clip 102. In an embodiment, a user may drive the side clamp surface 222 with an impact using a hammer. As such, a user may install the clip 102 onto the first flange 114 and the second flange 120 by driving the clamp 104 in the lateral direction of the clip 102 with a hammer, and then remove the clamp 104 in the longitudinal direction with the hammer.

In an embodiment, the channel 210 extends straight through the clamp 104 in the longitudinal direction of the clip 102. The second longitudinal clamp end 220 includes similar features, and functions in a similar manner as the first longitudinal clamp end, further description of which will be omitted for the sake of brevity. With this construction, the clamp 104 may be removed from the clip 102, the first flange 114 and the second flange 120 backward or forward in the longitudinal direction of the clip 102.

The exterior clip surface 160 and the interior clamp surface 184 include complementary planar segments that extend straight in the longitudinal direction of the clip 102. In this regard, referring back to FIG. 2, the interior clamp surface 184 includes a pair of distal inclined surfaces 224 that are planar and mate with the exterior clip surface 160 at the first clip end portion 130 and the second clip end portion 134 when the clip 102 is in the loaded position.

More specifically, the pair of distal inclined surfaces 224 includes a first distal inclined surface 230 formed from the first clamp end portion 194. The first distal inclined surface 230 mates with the exterior clip surface 160 at the first clip end portion 130 when the clip 102 is in the loaded position.

The pair of distal inclined surfaces 224 also includes a second distal inclined surface 232 formed from the second clamp end portion 200. The second distal inclined surface 232 mates with the exterior clip surface 160 at the second clip end portion 134 when the clip 102 is in the loaded position.

When the clip 102 is placed in the loaded position, the clamp 104 compresses the clip 102, and generates a corresponding spring force in the clip 102. More specifically, the first clip end portion 130 and the second clip end portion 134 press the first clamp end portion 194 and the second clamp end portion 200 outward in the normal direction of the clip 102 when the clip 102 is in the loaded position.

In this regard, as shown in FIG. 3, the first clip end portion 130 and the second clip end portion 134 are angled away from each other in the normal direction of the clip 102 by a first angle that is a clip angle when the clip 102 is unrestrained in a free state. As shown in FIG. 2, the first distal inclined surface 230 and the second distal inclined surface 232 are angled away from each other in the normal direction, and in this manner define a second angle that is a distal interior angle of the interior clamp surface 184. The distal interior angle of the interior clamp surface 184 is smaller than the first angle defined between the first clip end portion 130 and the second clip end portion 134 in the free state.

As such, when the clip 102 is in the loaded position with the exterior clip surface 160 mated to the distal inclined surfaces 224 of the clamp 104, the first clip end portion 130 and the second clip end portion 134 are bent inward in the normal direction at the middle clip portion 142. In this manner, the first clip end portion 130 and the second clip end portion 134 are oriented to the second angle by the first distal inclined surface 230 and the second distal inclined surface 232 when the clip 102 is placed in the loaded position.

The first clip end portion 130 and the second clip end portion 134 bend elastically from the free state to the loaded position. With this construction, the clip 102 to generates a spring force against the interior clamp surface 184 when the clip 102 is placed in the loaded position, where the first clip end portion 130 and the second clip end portion 134 respectively press outward against the first clamp end portion 194 and the second clamp end portion 200.

The spring force generated in the clip 102 against the clamp 104 increases an amount of friction between the exterior clip surface 160 and the interior clamp surface 184. As such, the clip 102 may be retained in the loaded position when the clip 102 and the clamp 104 are transported or handled together by a user.

The interior clamp surface 184 also includes a pair of proximal inclined surfaces 234 that are planar and mate with the exterior clip surface 160 at the first clip end portion 130 and the second clip end portion 134 when the clip 102 is in the inserted position. In this regard, the proximal inclined surfaces 234 include a first proximal inclined surface 240 that mates with the exterior clip surface 160 at the first clip end portion 130 when the clip 102 is in the inserted position. The proximal inclined surfaces 234 also include a second proximal inclined surface 242 that mates with the exterior clip surface 160 at the second clip end portion 134 when the clip 102 is in the inserted position.

The pair of proximal inclined surfaces 234 define a third angle that is a proximal interior angle of the interior clamp surface 184. The proximal interior angle of the interior clamp surface 184 is smaller than the distal interior angle defined by the pair of distal inclined surfaces 224. With this construction, as shown in FIG. 4, the pair of proximal inclined surfaces 234 bend the first clip end portion 130 and the second clip end portion 134 from the distal interior angle to the proximal interior angle when the clip 102 is driven from the loaded position toward the inserted position.

With continued reference to FIG. 4, the proximal inclined surfaces 234 extend straight in the lateral direction of the clip 102. As such, the clamp 104 drives the first clip end portion 130 and the second clip end portion 134 flatly into sides of the first flange 114 and the second flange 120. While, as depicted, the clamp 104 is configured to drive the first clip end portion 130 and the second clip end portion 134 flatly into the first flange 114 and the second flange 120, the proximal inclined surfaces 234 may define a variety of shapes that drive the first clip end portion 130 and the second clip end portion 134 into the first flange 114 and the second flange 120 when the clip 102 slides toward the inserted position without departing from the scope of the subject disclosure.

The clip 102 is obstructed by the clamp 104 at the first tabs 164 and the second tabs 172 from sliding out of the loaded position or the inserted position in the lateral direction of the clip 102. In this regard, the interior clamp surface 184 defines a set of distal detents 244 and a set of proximal detents 250 at the first clamp end portion 194 and the second clamp end portion 200. The distal detents 244 and the proximal detents 250 catch the first tabs 164 and the second tabs 172 respectively in the loaded position and the inserted position, and obstruct the clip 102 from sliding forward relative to the clamp 104 in the front-back direction of the clip 102.

In this regard, with continued reference to FIG. 4, the interior clamp surface 184 defines the distal detents 244 between the distal inclined surfaces 224 and the proximal inclined surfaces 234 in the lateral direction of the clip 102, where the first tabs 164 and the second tabs 172 extend in the loaded position. More specifically, the first clamp end portion 194 defines a first distal detent 252 in the interior clamp surface 184 between the first distal inclined surface 230 and the first proximal inclined surface 240, where the first tabs 164 extend from the exterior clip surface 160 in the loaded position. The second clamp end portion 200 defines a second distal detent 254 in the interior clamp surface 184 between the second distal inclined surface 232 and the second proximal inclined surface 242, where the second tabs 172 extend from the exterior clip surface 160 in the loaded position. With this construction, the first distal detent 252 catches the first tabs 164, and the second distal detent 254 catches the second tabs 172 when the clip 102 is disposed in the loaded position.

The interior clamp surface 184 defines the proximal detents 250 rearward of the proximal inclined surfaces 234 in the front-back direction of the clip 102. With this construction, the proximal detents 250 are located at a side of the proximal inclined surfaces 234 opposite the distal detents 244, where the first tabs 164 and the second tabs 172 extend in the inserted position. More specifically, the first clamp end portion 194 defines a first proximal detent 260 in the interior clamp surface 184 at a side of the first proximal inclined surface 240 opposite the first distal detent 252, where the first tabs 164 extend from the exterior clip surface 160 in the inserted position. The second clamp end portion 200 defines a second proximal detent 262 in the interior clamp surface 184 at a side of the second proximal inclined surface 242 opposite the second distal detent 254. With this construction, the first proximal detent 260 catches the first tabs 164, and the second proximal detent 262 catches the second tabs 172 when the clip 102 is disposed in the inserted position.

While, as depicted, the distal detents 244 and the proximal detents 250 each include two detents defined in opposite sides of the clamp interior surface 184 that catch the first tabs 164 and the second tabs 172, the clamp interior surface 184 may have more or fewer detents that catch more or fewer corresponding tabs when the clip 102 is in the loaded position or the inserted position without departing from the scope of the subject disclosure.

Figures 5, 6, 10, 11, 12, 13:
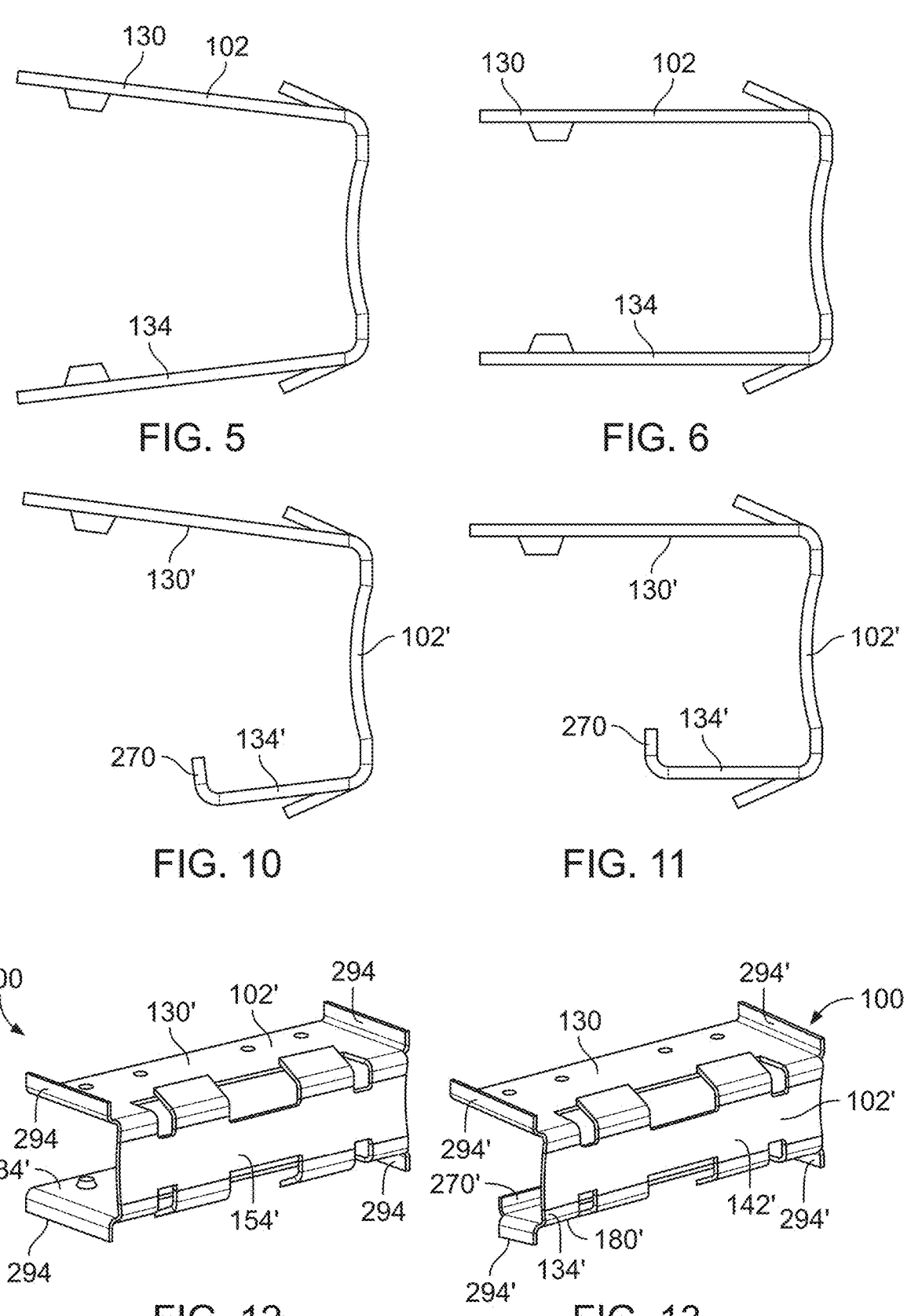
FIG. 5 is a side view of the clip in a second clip position.
FIG. 6 is a side view of the fastening system of FIG. 1 with the clip in an inserted position relative to the clamp.
FIG. 10 is a side view of the clip in a first clip position.
FIG. 11 is a side view of the clip in a second clip position.
FIG. 12 is a perspective view of the clip of FIG. 3, according to an alternative embodiment.
FIG. 13 is a perspective view of the clip of FIG. 8, according to an alternative embodiment.

FIG. 5 depicts the clip 102 in a first clip position, where the first clip end portion 130 and the second clip end portion 134 are angled away from each other. The first clip end portion 130 and the second clip end portion 134 are angled away from each other in the normal direction of the clip 102 by the first angle. The first angle is a clip angle between the first clip end portion 130 and the second clip end portion 134 when the clip 102 is unrestrained in a free state. While the first clip end portion 130 and the second clip end portion 134 are angled away from each other by the first angle as depicted, the first clip angle may be wider or narrower without departing from the scope of the subject disclosure.

In this regard, FIG. 6 depicts the clip 102 in a second clip position alternative to the first clip position. In the second clip position, the first clip end portion 130 and the second clip end portion 134 are oriented in parallel with each other and extend flatly in the lateral direction and the longitudinal direction of the clip 102. Referring back to FIG. 1, the first flange 114 includes a top surface 264 opposite the bottom surface 122 in the normal direction of the clip 102. The second flange 120 includes a bottom surface 266 opposite the top surface 124 in the normal direction of the clip 102.

Both the top surface 264 of the first flange 114 and the bottom surface 266 of the second flange 120 are planar, and extend flatly in the longitudinal direction and the lateral direction of the clip 102. With this construction, the first clip end portion 130 and the second clip end portion 134 respectively slide along the first flange 114 and the second flange 120 when the clip 102 is driven toward the inserted position by the clamp 104.

FIG. 7 depicts the clip 102 fixed with the clamp 104 in the loaded position with a retaining mechanism 268 disposed around the clip and the clamp, through the channel 210. The retaining mechanism 268 obstructs movement of the clip 102 out of the loaded position in the lateral direction of the clip 102. With this construction, the clip 102 may be further restrained from moving out of the loaded position during transport, or while being handled by a user. While, in the depicted embodiment, the retaining mechanism 268 is a band, such as a band of rubber or tape, the retaining mechanism may additionally or alternatively include a variety of fasteners that hold the clip 102 in the clamp 104 through the channel 210, such as a rope or a spring clip, without departing from the scope of the subject disclosure.

Notably, because the retaining mechanism 268 is disposed through the channel 210, the retaining mechanism 268 is relatively stable around the clip 102 and the clamp 104, and protected from wear by the clip 102 and the clamp 104. As such, the retaining mechanism and may avoid removal from the fastening system 100 before the clip 102 is to be driven onto an object.

Figure 8:
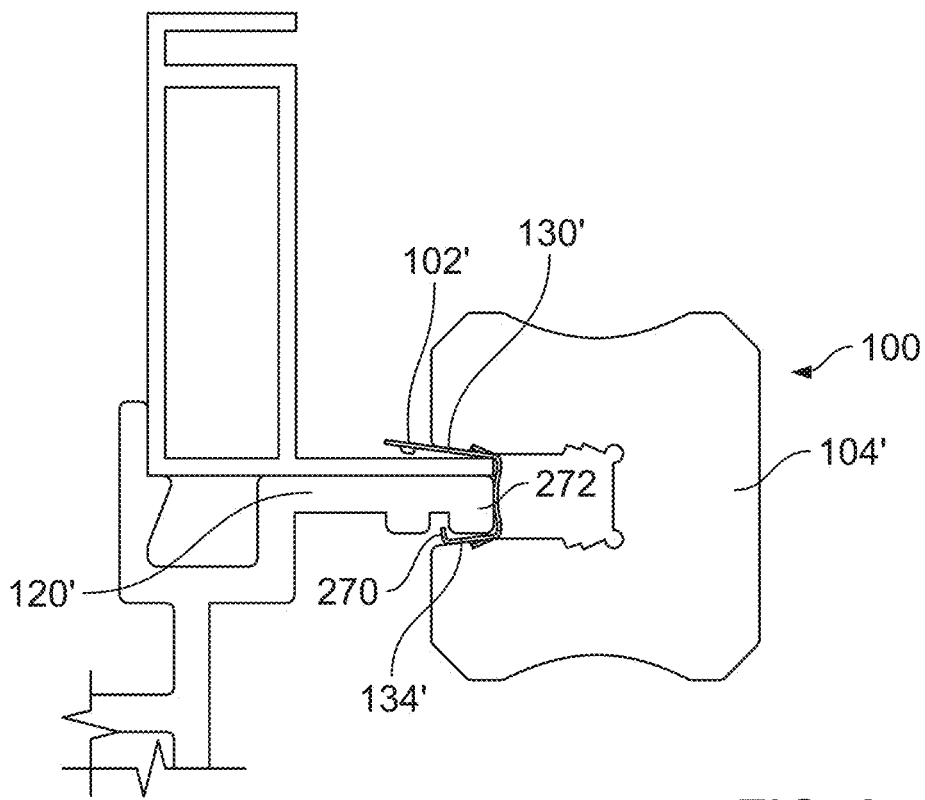
FIG. 8 is a side view of a fastening system including a clip and a clamp in accordance with aspects of the innovation, with the clip in a loaded position relative to the clamp.
Figure 9:
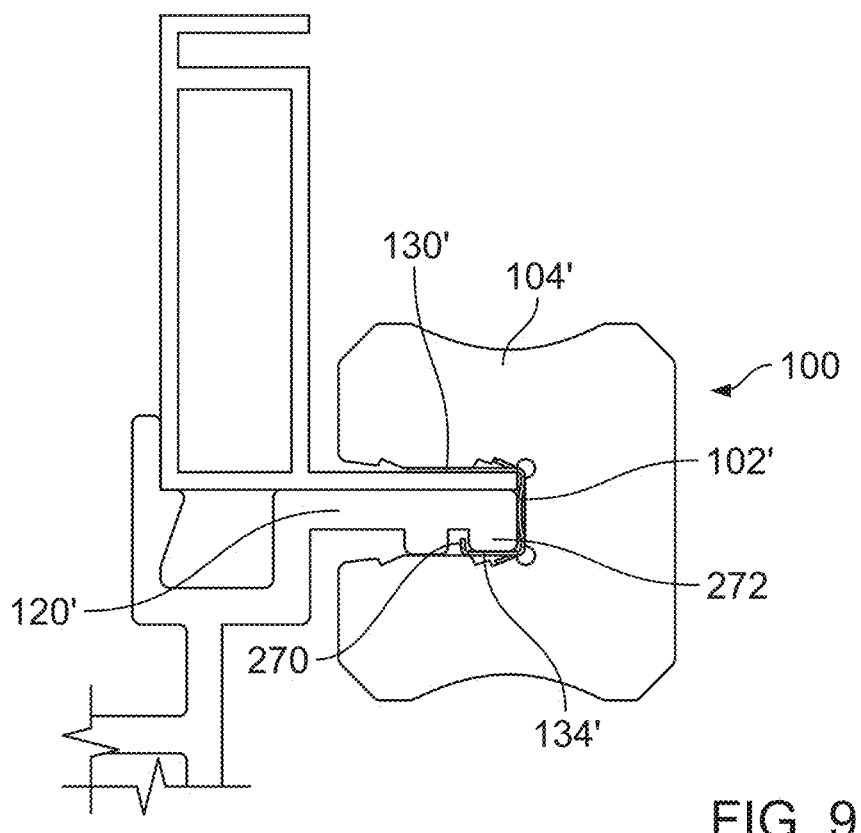
FIG. 9 is a side view of the fastening system of FIG. 8, with the clip in an inserted position relative to the clamp.

FIGS. 8 and 9 illustrate an alternate embodiment of the fastening system 100 of FIGS. 1-7. In the embodiment of FIGS. 8 and 9, like elements with the fastening system 100 of FIGS. 1-7 are denoted with the same reference numerals but followed by a primed suffix ('). FIG. 8 illustrates an embodiment of the fastening system 100 where the clip 102' is in the loaded position, and includes a hook 270 formed from a bend in the second clip end portion 134'.

In this regard, the second clip end portion 134' is shaped to extend upward in the normal direction of the clip 102' where the second clip end portion 134' engages the second flange 120'. The second flange 120' includes a lip 272 extended downward from the first flange 114' in the normal direction of the clip 102'.

As shown in FIG. 8, the hook 270 extends around the lip 272 when the clip 102' is installed on the first flange 114' and the second flange 120', fixing the second clip end portion 134' with the second flange 120' at the lip 272. In this regard, the hook 270 extends along and contacts the lip 272, obstructing movement of the second clip end portion 134' with respect to the second flange 120' in the lateral direction and the normal direction of the clip 102'. While, as depicted, the second clip end portion 134' forms the hook 270 for catching the lip 272 at the second flange 120', the first clip end portion 130' or the second clip end portion 134' may additionally or alternatively include a variety of shapes complementary to the first flange 114' and the second flange 120' for catching the clip 102' without departing from the scope of the subject disclosure.

FIG. 10 depicts the clip 102' in the first clip position, where the first clip end portion 130' and the second clip end portion 134' are angled away from each other. The first clip end portion 130' and the second clip end portion 134' are angled away from each other in the normal direction of the clip 102' by the first angle. The first angle is a clip angle between the first clip end portion 130' and the second clip end portion 134' when the clip 102' is unrestrained in a free state. While the first clip end portion 130' and the second clip end portion 134' are angled away from each other by the first angle as depicted, the first clip angle may be wider or narrower without departing from the scope of the subject disclosure.

Referring back to FIG. 1, the first flange 114 includes a ridge 290 that extends downward in the normal direction of the clip 102 toward a same vertical position as the lip 272, and extends along the lip 272 in the longitudinal direction. The ridge 290 is planar, and forms the bottom surface 266 of the second flange 120 with the lip 272.

The ridge 290 is spaced from the lip 272 in the lateral direction of the clip 102. In this manner, the ridge 290 and the lip 272 define a slot 292 that receives the hook 270 when the clip 102 is installed on the second flange 120 and driven to the inserted position. With this construction, the hook 270 obstructs the second clip end portion 134 from forward or backward movement in the slot 292, or rotation about the normal direction of the clip 102 where the hook 270 is held between the lip 272 and the ridge 290.

FIG. 11 depicts the clip 102' in the second clip position alternative to the first clip position. In the second clip position, the first clip end portion 130' and the second clip end portion 134' are oriented in parallel with each other and extend flatly in the lateral direction and the longitudinal direction of the clip 102'. With this construction, the first clip end portion 130' and the second clip end portion 134' respectively slide along the first flange 114 and the second flange 120, until the hook 270 catches the lip 272 at the slot 292 when the clip 102' is driven toward the inserted position by the clamp 104'.

FIG. 12 illustrates an alternate embodiment of the fastening system 100 of FIGS. 1-7. In the embodiment of FIG. 12, like elements with the fastening system 100 of FIGS. 1-7 are denoted with the same reference numerals but followed by a primed suffix ('). FIG. 12 illustrates an embodiment of the fastening system 100 where the clip 102' includes side clip walls 294.

The side clip walls 294 extend outward from the first clip end portion 130' and the second clip end portion 134' in the normal direction of the clip 102', at opposite sides of the clip 102' in the longitudinal direction. The side clip walls 294 are integrally formed with the body 154', and extend directly from the first clip end portion 130' and the second clip end portion 134'. With this construction, the clip 102', including the side clip walls 294 may be formed from pressed or cut sheet metal, and manufactured relatively efficiently as compared to joining elements of the clip 102' from separate initial components.

Figure 14:
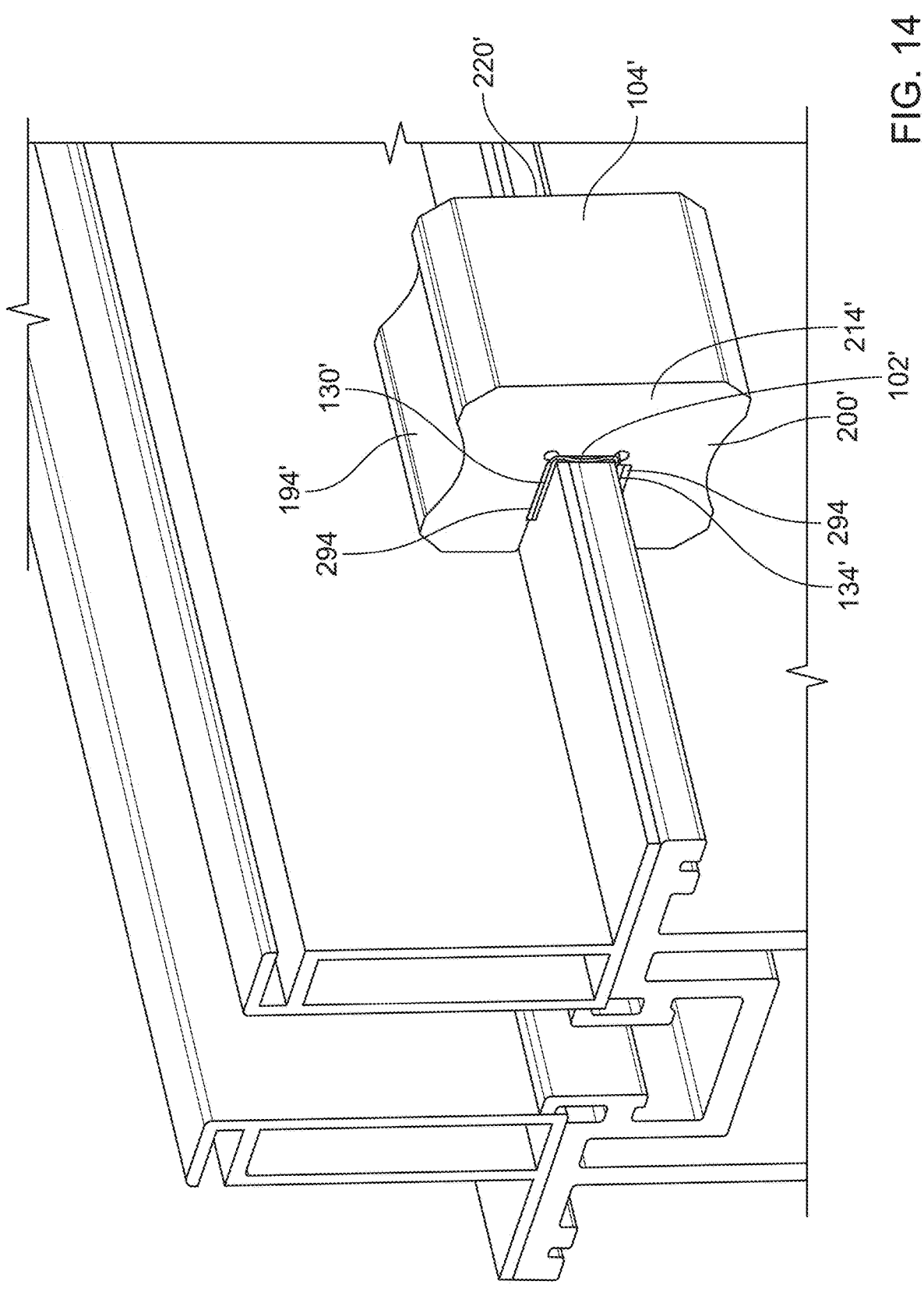
FIG. 14 is a perspective view of the fastening system of FIG. 1, including the clip of FIG. 12.

FIGS. 13 and 14 illustrate an alternate embodiment of the fastening system 100 of FIGS. 8-11. In the embodiment of FIGS. 13 and 14, like elements with the fastening system 100 of FIGS. 8-11 are denoted with the same reference numerals but followed by a primed suffix ('). FIG. 13 illustrates an embodiment of the fastening system 100 where the clip 102' includes the hook 270' and the side clip walls 294'.

In this regard, the side clip walls 294' extend downward from the second clip end portion 134', along the second clip end portion 134' from the corner 180' at the middle clip portion 142' to the bend forming the hook 270' in the lateral direction of the clip 102'. The side clip walls 294' are spaced from each other in the longitudinal direction of the clip 102' at opposite ends of the first clip end portion 130' and the second clip end portion 134', and extend outward in the normal direction.

As shown in FIG. 14, the first clip end portion 130' and the second clip end portion 134' extend in the longitudinal direction of the clip 102' a same distance as the first clamp end portion 194' and the second clamp end portion 200'. As such, the first clip end portion 130' and the second clip end portion 134' retain the clamp 104' between the side clip walls 294' in the longitudinal direction of the clip 102' when the clip is in the loaded position and the inserted position. In this regard, the side clip walls 294' grip the first longitudinal clamp end 214' and the second longitudinal clamp end 220', fixing the clip 102' with the clamp 104'. While, as depicted, the clip 102' includes four side clip walls 294' extended from the first clip end portion 130' and the second clip end portion 134', the clip 102' may include a total of at least two side clip walls 294' at opposite sides of the clip 102' for gripping the clamp 104' in the longitudinal direction without departing from the scope of the present disclosure.

With this construction, the clip 102' is permanently fixed with the clamp 104' when provided in the loaded position, where the clip 102' is restricted to sliding to the inserted position. In this manner, the clip 102' retains the clamp 104' on the first flange 114 and the second flange 120, where the clamp 104' holds the bottom surface 122 of the first flange 114 to the top surface 124 of the second flange 120.

Figure 16:
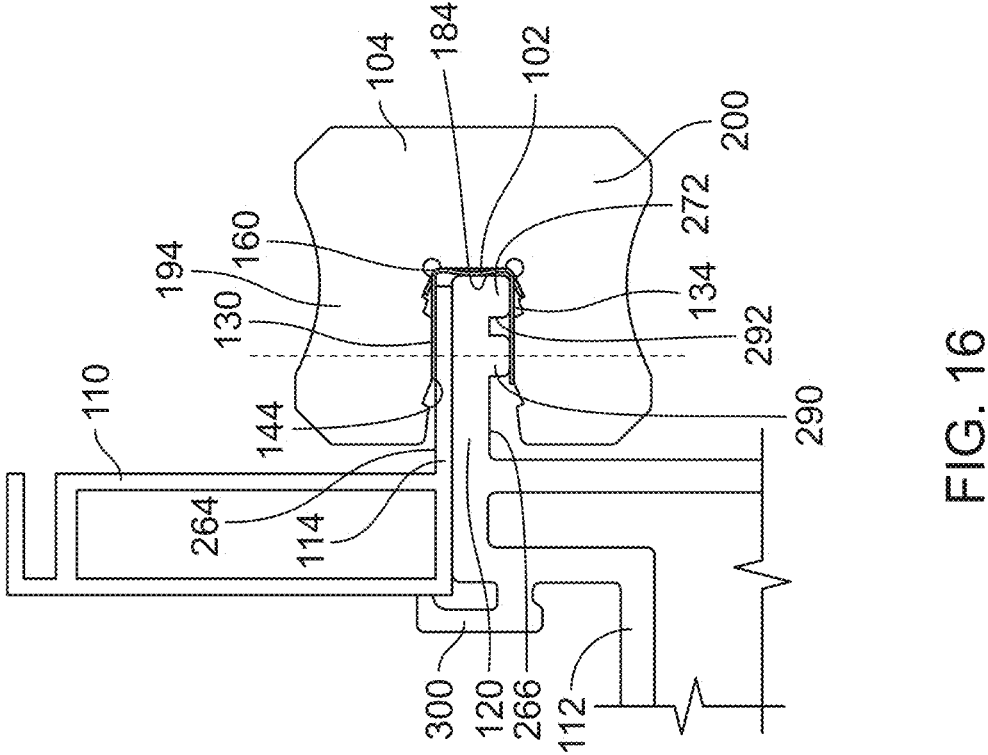
FIG. 16 is a side view of the fastening system of FIG. 1, with the clip in an inserted position relative to the clamp.
Figure 15:
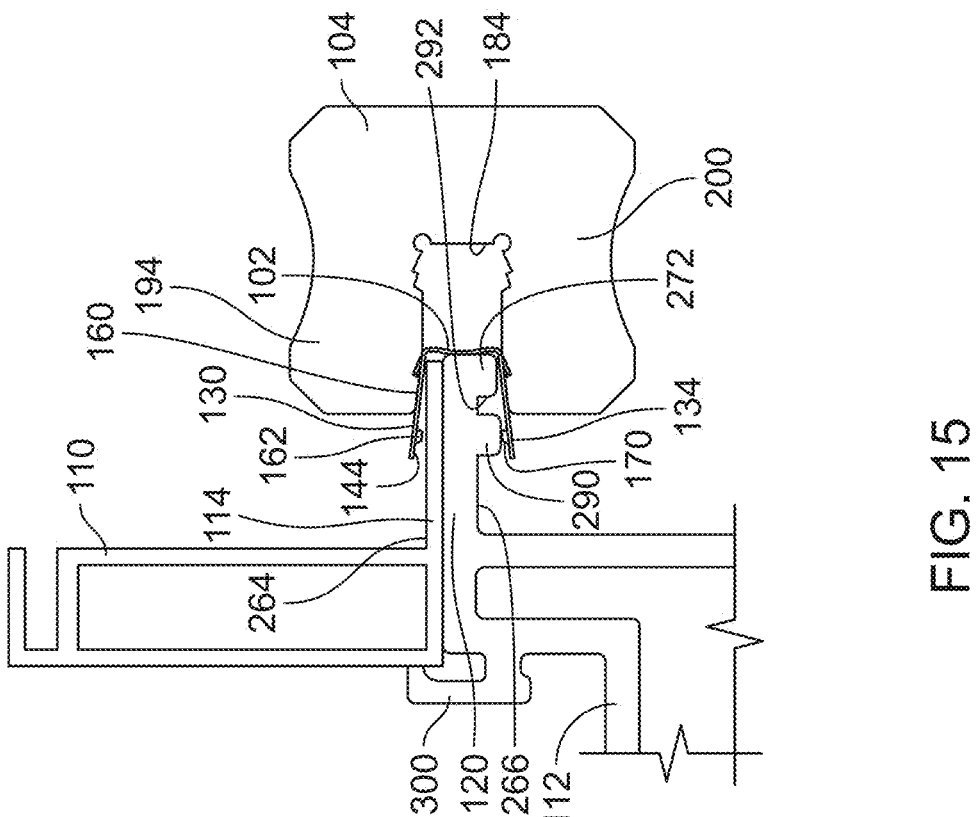
FIG. 15 is a side view of the fastening system of FIG. 1, with the clip in a loaded position relative to the clamp.

As shown in FIGS. 15 and 16, the first clip end portion 130 and the second clip end portion 134 are each pressed inward in the normal direction of the clip 102, into the top surface 264 of the first flange 114 and the bottom surface 266 of the second flange 120 when the clip 102 is driven to the inserted position. In this manner, the first protrusions 162 and the second protrusions 170 are driven into the top surface 264 of the first flange 114 and the bottom surface 266 of the second flange 120.

In an embodiment where the frame 110 is formed from an anodized metal and the rail 112 is formed from aluminum, the first protrusions 162 and the second protrusions 170 may respectively pierce the frame 110 and the rail 112 at the top surface 264 of the first flange 114 and the bottom surface 266 of the second flange 120. Where the clip 102 is formed from a conductive material, such as a metal, the clip 102 may electrically connect the frame 110 with the rail 112 across the body 154, bonding the frame 110 and the rail 112 with the clip 102.

The first clip end portion 130 and the second clip end portion 134 are flat and mated with the first clamp end portion 194 and the second clamp end portion 200 around the first protrusions 162 and the second protrusions 170, increasing the electrical contact between the clip 102 and the clamp 104. While, as depicted, the second protrusions 170 penetrate the bottom surface 266 of the second flange 120 at the ridge 290, the second protrusions 170 may penetrate the bottom surface 266 at the ridge 290, the lip 272, or other external surface of the second flange 120 for establishing electrical connection without departing from the scope of the subject disclosure.

The rail 112 includes a stop 300 that is a mechanical stop which obstructs the frame 110 from moving passed a mating position with the rail 112 in the lateral direction of the clip 102. The stop 300 extends upward from the first flange 114, and passed the second flange 120 in the normal direction of the clip 102. With this construction, the first flange 114 and the second flange 120 may be reliably aligned for mating by the clip 102 by positioning the frame 110 with the rail 112 against the stop 300. While, as depicted, the stop 300 extends from the rail 112 to reliably engage and locate the frame 110 in the lateral direction of the clip 102, the stop 300 may alternatively or additionally extend from the frame 110 to engage the rail 112 for locating the frame 110 with respect to the rail 112 without departing from the scope of the subject disclosure.

A method of assembling the fastening system 100 includes placing the clip 102 in the clamp 104, in the loaded position. In accordance with the method, the clip 102 includes the first clip end portion 130 extended in the lateral direction of the clip 102, and includes the second clip end portion 134 extended in the lateral direction of the clip 102, where the second clip end portion 134 is spaced from the first clip end portion 130 in the normal direction of the clip 102, and the first clip end portion 130 and the second clip end portion 134 define the exterior clip surface 160, and define the opening 144 into the clip 102 in the normal direction. In accordance with the method, the clamp 104 includes the first clamp end portion 194 and the second clamp end portion 200 extended in the lateral direction of the clip 102, and includes the interior clamp surface 184 formed from the first clamp end portion 130 and the second clamp end portion 134.

In accordance with the method, placing the clip 102 in the clamp 104 causes the interior clamp surface 184 to hold the clip 102 in the loaded position from the exterior clip surface 160 such that the clip 102 slides in the lateral direction. In this regard, the clip 102 slides relative to the clamp 104 from the loaded position to the inserted position when an object is inserted into the opening 144, and then slides out of the clamp 104 in a longitudinal direction perpendicular to the lateral direction and the normal direction.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited thereto.

It will be appreciated that various embodiments of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A fastening system, comprising:
a clip that includes:
  a first clip end portion extended in a lateral direction of the clip;
  a second clip end portion extended in the lateral direction of the clip, and spaced from the first clip end portion in a normal direction of the clip perpendicular to the lateral direction, wherein the first clip end portion and the second clip end portion form an exterior clip surface and define an opening in the normal direction; and
  a tab that is inclined outward from the exterior clip surface along the lateral direction; and
a clamp that includes:
  a first clamp end portion and a second clamp end portion extended in the lateral direction of the clip; and
  an interior clamp surface formed from the first clamp end portion and the second clamp end portion, the interior clamp surface defining a first distal inclined surface, a first proximal inclined surface, and a detent between the first proximal inclined surface and the first distal inclined surface in the lateral direction,
wherein the interior clamp surface holds the clip from the exterior clip surface such that when an object is inserted into the opening in the lateral direction, the clip slides in the lateral direction relative to the clamp from a loaded position to an inserted position, where the first clip end portion or the second clip end portion are respectively driven inward toward the object in the normal direction by the first clamp end portion or the second clamp end portion, and
the first distal inclined surface mates with the exterior clip surface when the clip is in the loaded position, the first proximal inclined surface mates with the exterior clip surface when the clip is in the inserted position, and the detent catches the tab when the clip is in the loaded position, obstructing the clip from moving out of the clamp in the lateral direction.

2. The fastening system of claim 1, wherein:
the first distal inclined surface is planar and mates with the exterior clip surface at the first clip end portion when the clip is in the loaded position,
the interior clamp surface includes a second distal inclined surface that is planar and mates with the exterior clip surface at the second clip end portion when the clip is in the loaded position, the first distal inclined surface and the second distal inclined surface are angled away from each other in the normal direction.

3. The fastening system of claim 2, the first clip end portion and the second clip end portion are angled away from each other in the normal direction by a first angle when the clip is in a free state, the first distal inclined surface and the second distal inclined surface are angled away from each other in the normal direction by a second angle that is smaller than the first angle, and the first clip end portion and the second clip end portion are oriented to the second angle by the first distal inclined surface and the second distal inclined surface, and generate a spring force against the interior clamp surface when the detent catches the clip in the loaded position from the free state.

4. The fastening system of claim 1, wherein:

the interior clamp surface includes a pair of distal inclined surfaces that mate with the exterior clip surface at the first clip end portion and the second clip end portion when the clip is in the loaded position, and a pair of proximal inclined surfaces that mate with the exterior clip surface at the first clip end portion and the second clip end portion when the clip is in the inserted position, the pair of distal inclined surfaces define a distal interior angle of the interior clamp surface, the pair of proximal inclined surfaces define a proximal interior angle that is smaller than a distal interior angle, and the pair of proximal inclined surfaces bend the first clip end portion and the second clip end portion from the distal interior angle to the proximal interior angle when the clip slides from the loaded position to the inserted position.

5. The fastening system of claim 1, wherein the interior clamp surface defines a channel straight in a longitudinal direction of the clip perpendicular to the lateral direction and the normal direction, and when the clip is in the inserted position, the clip exterior surface mates with the first proximal inclined surface, where the clip slides in the longitudinal direction out of the clamp via the channel.

6. The fastening system of claim 1, further comprising a retaining mechanism disposed around the clip and the clamp, through a channel defined in the clamp, wherein the channel extends in a longitudinal direction of the clip perpendicular to the lateral direction and the normal direction, and the retaining mechanism obstructs movement of the clip out of the loaded position in the lateral direction.

7. The fastening system of system 6, wherein the retaining mechanism is at least one of a band, rope, or a spring clip.

8. The fastening system of claim 1, wherein the clip further comprises a middle clip portion that connects the first clip end portion and the second clip end portion, the first clip end portion and the second clip end portion define the opening between a first distal tip and a second distal tip at a side of the clip opposite the middle clip portion in the lateral direction, and the first clip end portion extends flatly from the middle clip portion to the first distal tip, or the second clip end portion extends flatly from the middle clip portion to the second distal tip.

9. The fastening system of claim 1, wherein the detent is a first detent defined in the first clamp end portion, and the first clamp end portion defines a second detent at a side of the first proximal inclined surface opposite the first detent in the lateral direction, wherein the second detent catches the tab when the clip is in the inserted position, obstructing the clip from sliding out of the inserted position in the lateral direction.

10. The fastening system of claim 1, wherein the clip further comprises a middle clip portion that connects the first clip end portion and the second clip end portion, the middle clip portion extends between and spaces the first clip portion and the second clip portion in the normal direction, and the tab extends directly from the middle portion, beyond the exterior clip surface in the normal direction.

* * * * *